United States Patent [19]

Farooque

[11] Patent Number: 4,917,971

[45] Date of Patent: Apr. 17, 1990

[54] INTERNAL REFORMING FUEL CELL SYSTEM REQUIRING NO RECIRCULATED COOLING AND PROVIDING A HIGH FUEL PROCESS GAS UTILIZATION

[75] Inventor: Mohammad Farooque, Huntington, Conn.

[73] Assignee: Energy Research Corporation, Danbury, Conn.

[21] Appl. No.: 318,614

[22] Filed: Mar. 3, 1989

[51] Int. Cl.[4] .............................................. H01M 8/06

[52] U.S. Cl. ........................................ 429/19; 429/26; 429/34

[58] Field of Search ....................... 429/19, 20, 26, 34, 429/17

[56] References Cited

U.S. PATENT DOCUMENTS

| | | |
|---|---|---|
| 4,041,210 | 8/1977 | Van Dine 429 ............................ 16/ |
| 4,182,795 | 1/1980 | Baker et al. ........................... 429/13 |
| 4,276,355 | 6/1981 | Kothmann et al. .................... 429/26 |
| 4,620,914 | 11/1986 | Abens et al. ...................... 429/17 X |
| 4,686,157 | 8/1987 | Miyake et al. ........................ 429/19 |

*Primary Examiner*—Anthony Skapars
*Attorney, Agent, or Firm*—Robin, Blecker, Daley & Driscoll

[57] ABSTRACT

An internal reforming fuel cell system wherein the reforming reaction in the cell absorbs heat from the electrochemical reaction in the cell in an amount to substantially maintain the cell at a predetermined temperature and without the need for additional cooling considerations. The excess fuel process gas from the cell is utilized such that the net utilization of the process gas of the fuel cell and utilization device exceeds about 50%.

20 Claims, 5 Drawing Sheets

4
FUEL SUPPLY
2c
2b
2d
2a
2e
3
1
2
6
5
HYDROGEN UTILIZATION DEVICE
7

INTERNAL REFORMING FUEL CELL SYSTEM REQUIRING NO RECIRCULATED COOLING AND PROVIDING A HIGH FUEL PROCESS GAS UTILIZATION

BACKGROUND OF THE INVENTION

This invention relates to fuel cells and, in particular, to fuel cells in which reforming of hydrocarbon fuel supply is carried out internally of the cells.

There have been proposed a variety of fuel cell systems in which reforming of hydrocarbon fuel supply to produce hydrogen fuel process gas is carried out internally of the fuel cells of the system. The cells used in these systems are typically high temperature fuel cells such as, for example, molten carbonate fuel cells.

The internal reforming reaction is endothermic and helps to ofset heat generated in the fuel cell and, thus, to reduce the load on the fuel cell cooling system. Typically, the fuel cell is set for maximum utilization of process gas and realization of a desired operating temperature for the cell requires a cooling means usually in the form of a gas recirculation assembly. This assembly provides the needed cell cooling beyond that provided by the endothermic reforming reaction at the high process gas utilization.

The use of a cooling gas recirculation assembly, however, requires, a blower designed to accomodate the high temperatures of the fuel cell system. This, in turn, results in a high parasitic power requirement. Also, since the needed blowers are not conventional, they must be specially designed and manufactured at considerable expense. This increases significantly the cost of the overall fuel cell system, making it less attractive as an alternative to more conventional energy generation systems. Furthermore, use of process gas recirculation causes a higher pressure drop and also leads to undesired dilution of the reactants.

U.S. Pat. No. 4,187,795 discloses one fuel cell system in which the reforming reaction is used for achieving a desired operating temperature for the cell without requiring gas recirculation. In particular, in this system the reforming reaction is carried out in passages isolated from the process gas passages (i.e., isolated from the passages feeding the anode and cathode electrodes), and the flow of supply gas to these passages is controlled so that the cell operates at the desired temperature. The process gas flow in the process gas passages, in turn, is then controlled to obtain a desired electrical output. One drawback with the '795 patent system, however, is that to maintain desired fuel cell temperature, the system needs to reform a significantly larger quantity of fuel than can be utilized in the fuel cell.

While the '795 patent discloses that this excess fuel process gas can be used to feed the fuel process gas chamber of a further like internal reforming fuel cell placed in tandem with the first cell, this further cell also requires similar cooling as in the first cell. The further cell thus also needs to reform a significantly large quantity of fuel. As a result, the overall tandem arrangement likewise results in excess process gas and, in a practical system, would only utilize less than about 50% of the generated process gas.

It is, therefore, an object of the present invention to provide an internal reforming fuel cell system in which cooling is carried out via the internal reforming process, while the system is capable of utilizing at least 50%, but preferably, greater, amounts of generated fuel process gas.

SUMMARY OF THE INVENTION

In accordance with the principles of the present invention, the above and other objectives are realized in an internal reforming fuel cell system wherein the flow of fuel in the reforming reaction in the fuel cell is controlled so as to substantially realize a desired or preselected operating temperature for the cell, and wherein a gas utilization means is provided which is adapted to utilize the excess fuel process gas exhausted from the cell such that the net utilization of fuel process gas by the cell and utilization means is greater than about 50% and, preferably, approaches about 95%.

The system of the invention thus requires no recirculation cooling assembly and, hence, no specially designed recirculation blower. The system, furthermore, reduces internal power needs and prevents undesired dilution of reactants. Finally, the combined effect of the fuel cell and gas utilization means results in an effective utilization of fuel process gas in the system.

A variety of embodiments of the system of the invention are disclosed hereinafter. In one embodiment, the utilization means comprises a low temperature fuel cell which is adapted to receive anode passage exhaust containing the excess fuel process gas. In this system, further advantages are realized by burning the gas exhausted from the anode chamber of the low temperature cell with oxidant gas to generate the oxidant process gas for the internal reforming cell.

In a second embodiment, anode passage exhaust containing the excess fuel process gas is passed through a hydrogen transfer device to develop ultra pure hydrogen which is then utilized in the utilization means. In this case also, the exhaust gas from the hydrogen transfer device is burned with oxidant to develop the oxidant gas for the internal reforming fuel cell system.

In a third embodiment, the interal reforming fuel cell is used to feed a utilization device comprising a methanol synthesizer and/or a reformer feeding the synthesizer.

In a fourth embodiment, the fuel cell is used in conjunction with a utilization device and with another high temperature internal reforming fuel cell which is operated in the conventional manner adapting process gas cooling.

DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
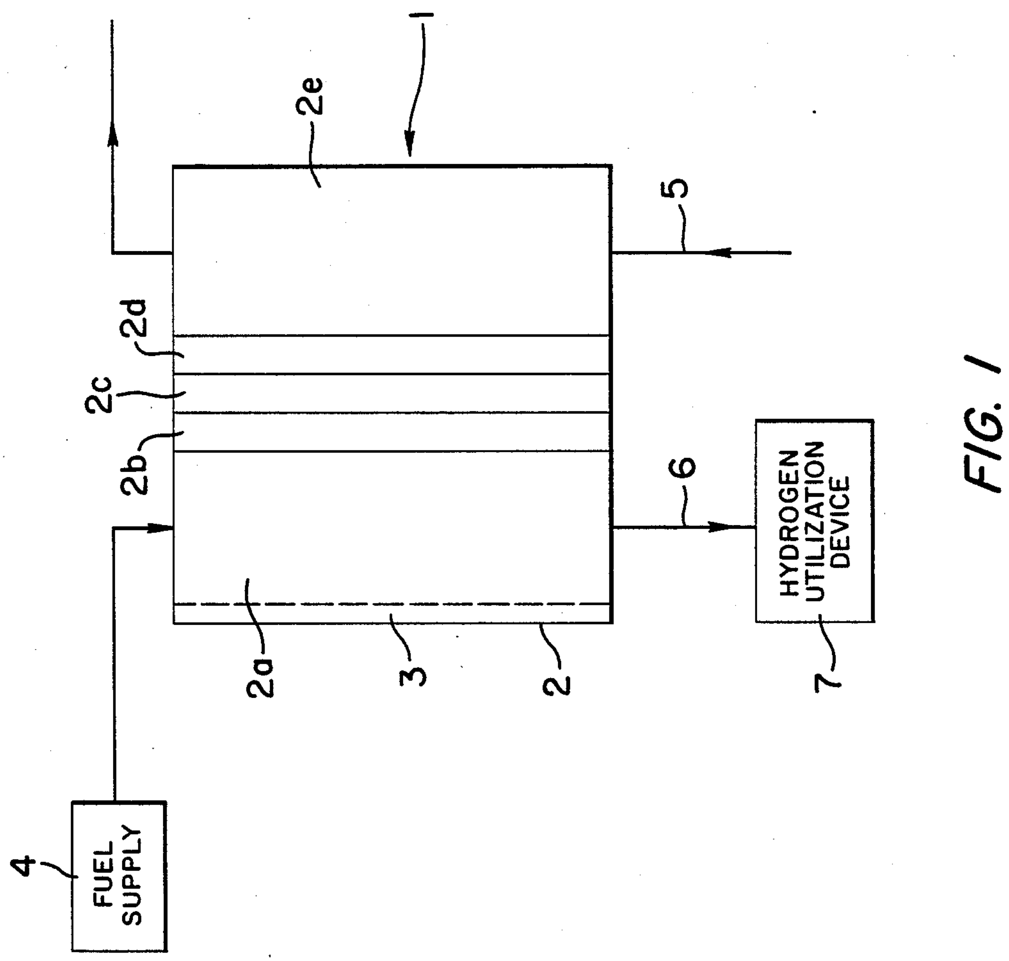
FIG. 1 shows a fuel cell system in accordance with the principles of the present invention.

FIG. 1 shows a fuel cell system 1 in accordance with the principles of the present invention. The system 1 comprises a high temperature fuel cell 2, assumed for the purposes of discussion to be a molten carbonate fuel cell, having reforming catalyst 3 within the cell. As illustrated, the catalyst 3 is disposed within the anode chamber of the cell and, in the particular case shown, in a chamber passage *2a* which communicates with the cell anode electrode 2*b*. Alternately the passage 2*a* could be a passage which is isolated from the anode 2*b* and, therefore, also from the electrolyte 2*c* which communicates with the anode.

The purpose of the catalyst 3 is to reform hydrocarbon fuel (e.g. methane) supplied from a fuel supply 4 to the anode passage 2*a* to develop hydrogen fuel process gas. Electrolyte 2*c* also communicates with a cathode electrode 2*d* disposed in a cathode chamber passage 2*e* of the cell 2. An oxidant process gas 5 is coupled to the cathode passage 2*e*.

In operation of the cell 2, the hydrocarbon fuel supplied to the anode chamber 2*a* is reformed by the catalyst 3 to produce hydrogen fuel process gas for the cell. This gas impinges on the anode electrode 2*b* and, in the presence of the electrolyte 2*c*, undergoes an electrochemical conversion reaction with the oxidant process gas being supplied to the cathode electrode 2*d*.

As in known, the aforesaid electrochemical conversion reaction is exothermic and thus produces heat, while the reforming reaction is endothermic and, thus, absorbs some of the heat which is generated by the electrochemical reaction. In accordance with the principles of the present invention, the flow of the fuel in the anode chamber 2*a* is controlled such that the heat of the electrochemical reaction absorbed by the reforming reaction is sufficient to maintain the fuel cell at or substantially at a desired or preselected operating temperature.

Operation of the fuel cell 2 in this manner thus avoids the necessity of using additional cooling equipment such as a recirculation cooling assembly as is used in some prior systems. This, in turn, avoids having to employ specialized high temperature blowers for the recirculation and, therefore, significantly reduces the overall cost and parasitic power consumption of the system.

A consequence of operating the fuel cell 2, as above-described, is that the amount of hydrogen fuel process gas produced by the reforming reaction in the anode passage 2*a* far exceeds the amount utilized in the electrochemical conversion reaction. In practical systems, the maximum utilization of the hydrogen process gas is less than about 50%. Accordingly, the anode passage exhaust stream 6 will contain substantial amounts of hydrogen, in addition to carbon dioxide, carbon monoxide, water and small amounts of unreformed fuel (methane).

In further accord with the invention, the anode exhaust stream 6 is coupled to a hydrogen utilization device 7 which is capable of efficiently utilizing the excess hydrogen for a useful purpose such that the net utilization of hydrogen process gas in the combined system of the fuel cell and utilization device exceeds about 50% and, preferably, approaches about 95%. As a result, substantially all the hydrogen resulting from the reforming reaction is eventually consumed, thereby resulting in an overall highly efficient gas utilization system.

As above-indicated, the flow of fuel process gas to the cell 2 may be set so as to only substantially result in the preselected operating temperature for the cell 2. In such case, additional cooling of the cell 2 to precisely reach the preselected temperature may be provided by some additional or excess flow of oxidant process gas to the cathode chamber 2*e*.

Figure 2:
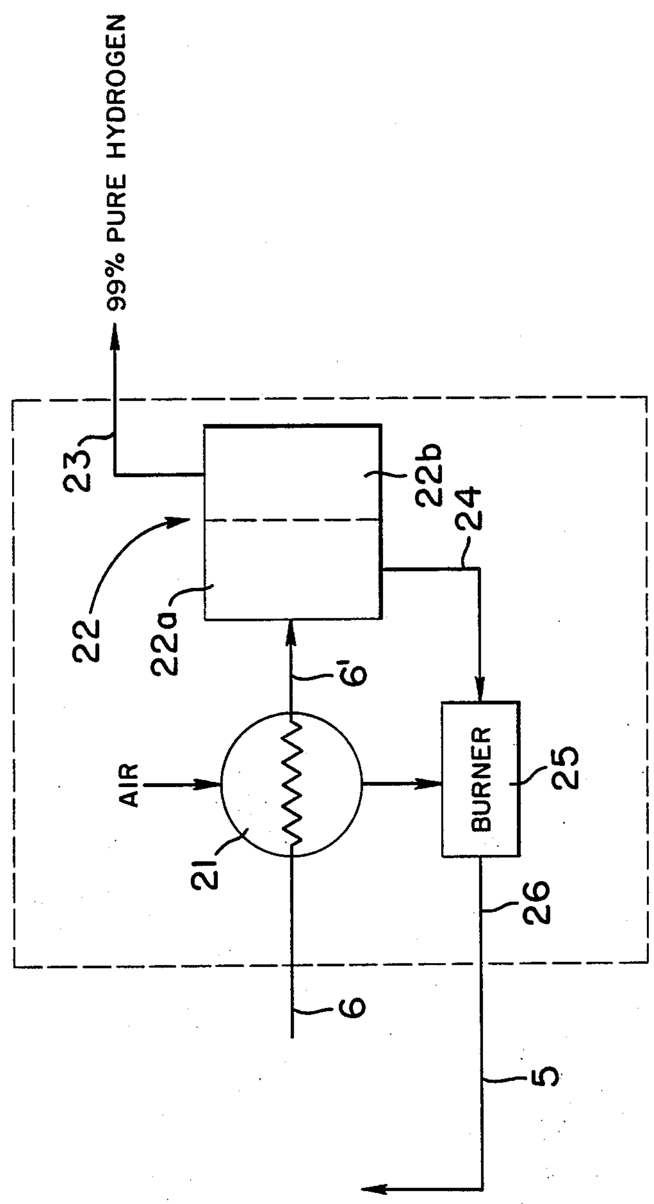
FIGS. 2–5 show further embodiments of fuel cell systems in accordance with the principles of the present invention.

FIG. 2 shows an embodiment of the invention of FIG. 1 in which the utilization device 7 includes a shift converter 21. The latter converter is provided to perform a water-gas shift reaction on the water and carbon monoxide in the anode extraust stream 6 to produce additional hydrogen for the stream. The resultant stream 6' is then passed into the anode compartment 22*a* of a hydrogen transfer device 22 of the type disclosed in U.S. Pat. No. 4,620,914, assigned to the same assignee hereof.

The transfer device 22 couples the hydrogen in the introduced stream 6' to its cathode compartment 22*b* to result in a substantially pure hydrogen gas stream 23 which can then be used, as discussed above to achieve the desired net utilization of 50% or greater. The exhaust gas stream 24 from the anode compartment 22*a* of the device 22, in turn, now contains small traces of hydrogen and a large amount of carbon dioxide which can be used in another process.

The stream 24 is fed to a burner 25 where it is burned with oxidant supply gas (air) after the latter is heated in passage through shift converter 21. The resultant oxidant stream 26 then serves as the oxidant stream 5 for the fuel cell 2. Because of the carbon dioxide in the stream 24, the oxidant gas stream 26 will have an amount of carbon dioxide in excess of that required by the cell 2 in its cathode passage 2*e* for suitable electrochemical conversion.

Figure 3:
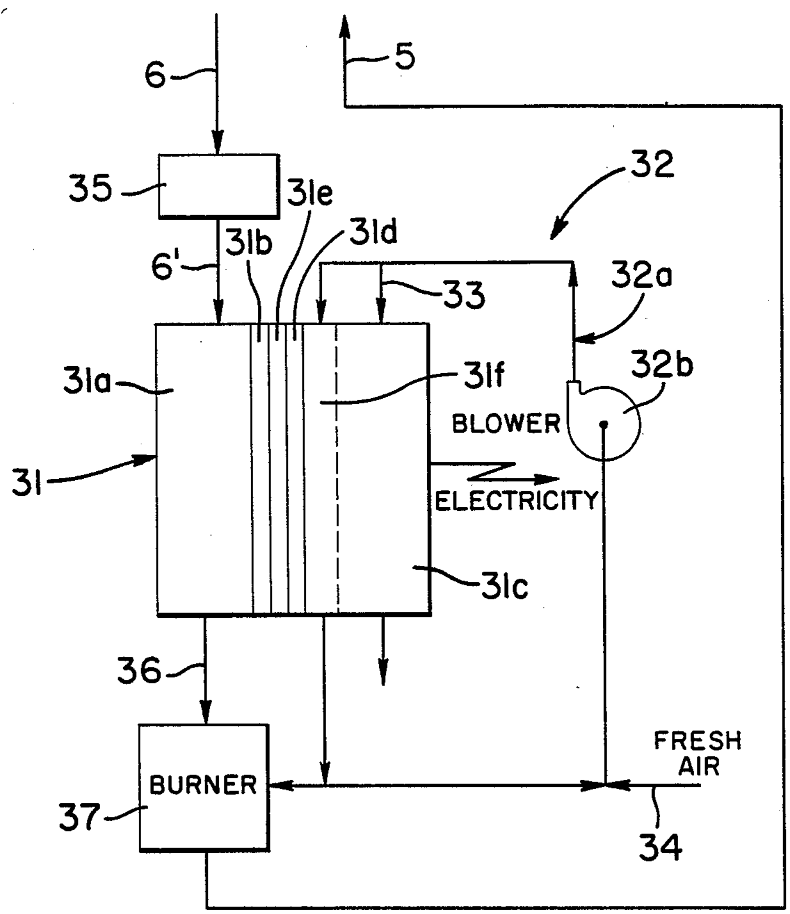

FIG. 3 shows another embodiment of the system of the invention. In this embodiment, the utilization device 7 comprises a conventional low temperature fuel cell, illustrated in FIG. 3 as a phosphoric acid cell 31.

The cell 31 comprises anode and cathode chambers 31*a*, 31*c* containing anode and cathode electrodes 31*b* and 31*d* which are separated by an electrolyte 31*e*. A cooling assembly 32 for the cell 31 includes a recirculation loop 32*a*, a blower 32*b* and a cooling chamber 31*f* provided in the cell 31. Due to the low temperature operation of the cell 31, the aforesaid components of the assembly 32 can be conventional in nature and inexpensively implemented and also require less parasitic power, as described in U.S. Pat. No. 4,276,355. An oxidant process gas stream 33 for the cathode chamber 31*c* of the cell 31 is derived from the loop 32*a* and fresh oxidant is supplied to the loop via supply stream 34.

The fuel process gas for the anode chamber 31*a* of cell 31 is generated by shift converting the anode exhaust stream 6 of the cell 2 via a shift converter 35. This shift converter operates like the converter 21 of FIG. 2 to convert the water and carbon monoxide in the stream 6 to hydrogen and carbon dioxide. The resultant stream 6' is then fed to the anode chamber 31*a*. Since the anode of the cell 31*a* operates more efficiently than the anode of the cell 2, particularly with dilute fuel gas, the electrochemical conversion of the hydrogen in the stream 6' with the oxidant process gas in the cathode chamber 31*c* via the electrolyte 31*e*, results in substantial (e.g., about 80–90%) utilization of the hydrogen. The net utilization of the hydrogen process gas in the overall system containing the cells 2 and 31 is thus high.

A further added benefit of the system of FIG. 3 is that the exhaust stream 36 from the anode chamber 31*a* of the cell 31 is itself now high in carbon dioxide content. As a result, when burned in burner 37 with oxidant from the loop 32, it results in an oxidant gas stream high in carbon dioxide content. This stream can then be used as the oxidant stream 5 for the cathode passage of the fuel cell 2, in a like manner as in the FIG. 2 embodiment, and will have the excess carbon dioxide needed by the cathode.

Figure 4:
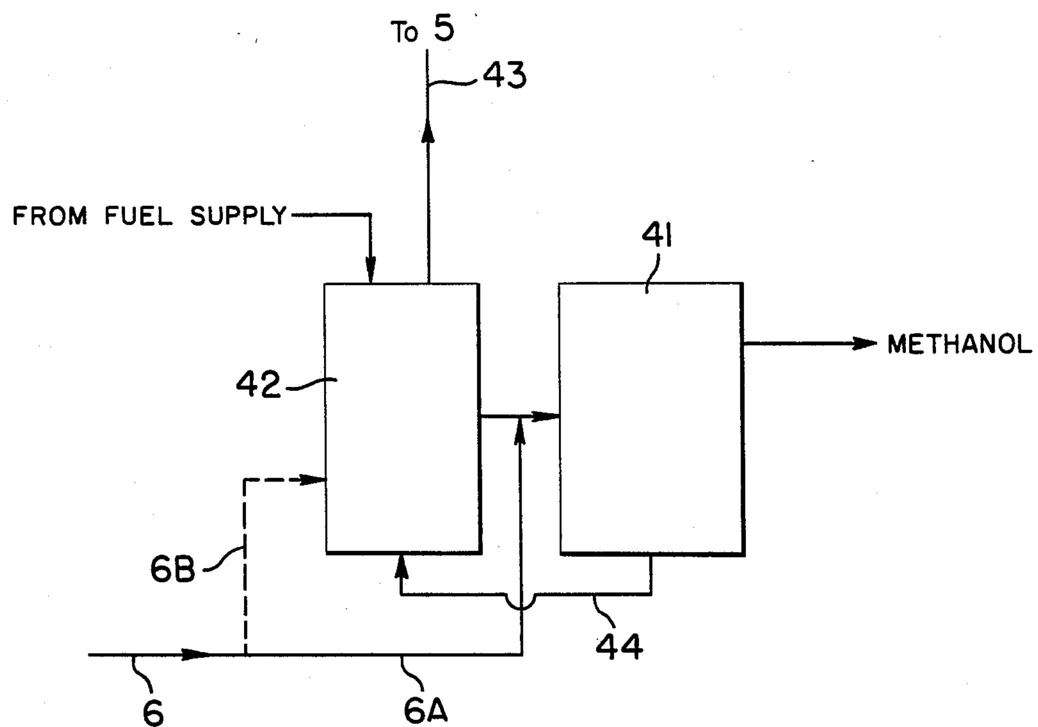

FIG. 4 shows a further embodiment of the invention wherein the anode exhaust stream 6 of the fuel cell 2 is used to help control the feed to a methanol synthesizer 41. This is accomplished either by combining the anode exhaust stream 6 with the output of a conventional reformer 42 (as shown by stream 6A) or by feeding the stream to the reformer itself (as shown by dotted stream 6B). In either case, by controlling the hydrogen and/or other gas content (carbon dioxide and/or carbon monoxide) of the output stream of the reformer and/or the exhaust stream 6, the desired stoichiometric number, i.e., $(H_2\ CO_2)/(CO_2+CO)$ for the feed to the synthesizer 41 can be achieved. The stoichiometric number required for the input feed to the synthesizer 41 is generally about equal to 2 and further details regarding same and the details of the synthesizer 41 are disclosed, for example, in U.S. Pat. No. 4,777,634, assigned to the same assignee hereof. In this case also, the net utilization of hydrogen process gas in the system is controlled to exceed 50%.

As shown in FIG. 4, the remnant non methanol output 44 of the synthesizer 41 containing $H_2$, $CO_2$, CO and $CH_4$ is recirculated back to the reformer 42. Furthermore, a portion of the reformer flue gas stream 43 containing carbon dioxide can be combined with the oxidant stream 5 feeding the cathode passage 2*e* of the cell 2 to provide the needed carbon dioxide content for this stream.

Figure 5:
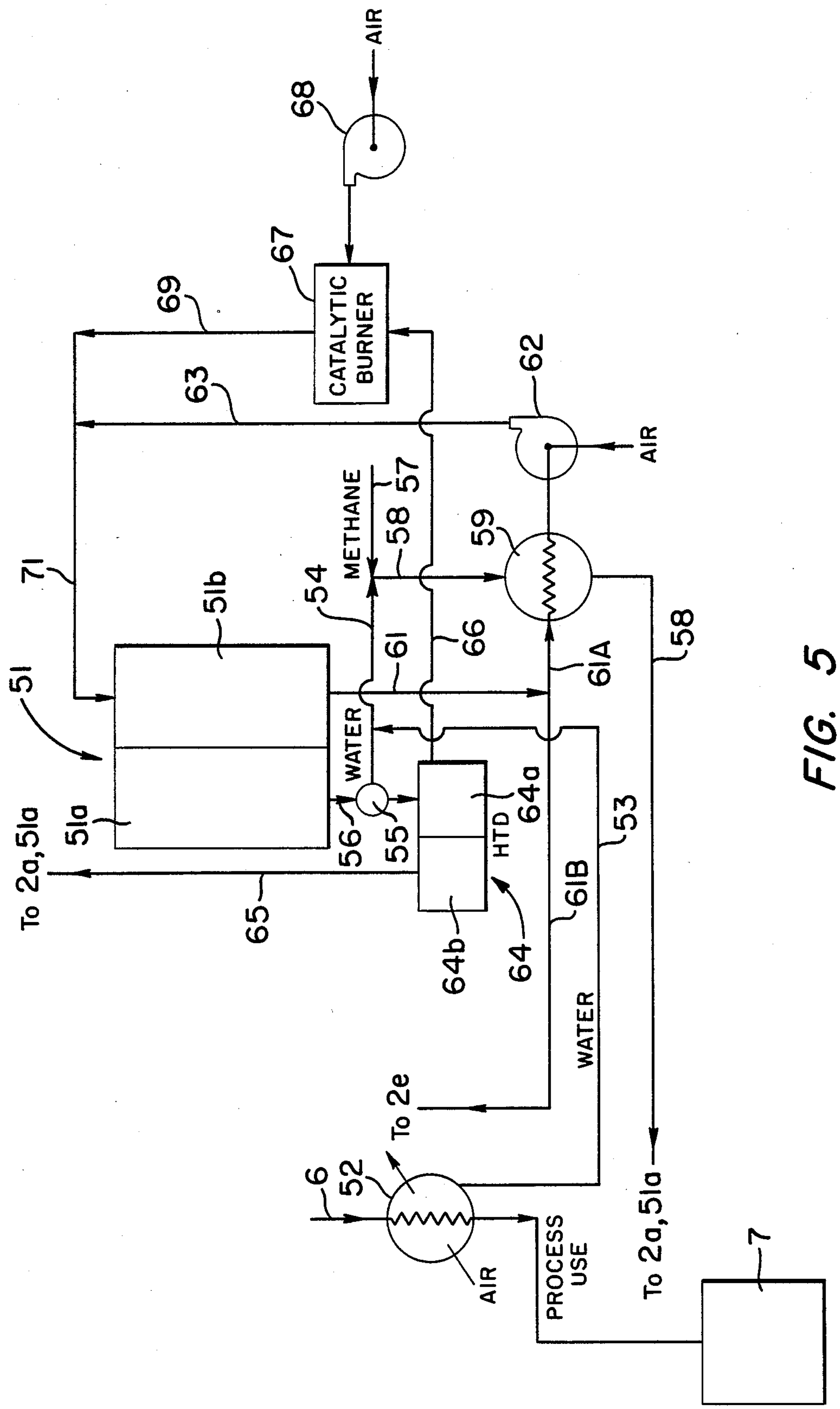

FIG. 5 shows a further embodiment of the invention wherein the fuel cell 2 is used in conjunction with the utilization device 7 and in further conjunction with a high temperature internal reforming fuel cell also assumed to be a molten carbonate fuel cell 51. In this case, the exhaust stream 6 of the cell 2 is passed through a heat exchanger 52 to remove water from the stream. This water is conveyed by a line 53 to a further line 54 which receives additional water developed by a heat exchanger 55 from the exhaust stream 56 from the anode compartment 51*a* of the cell 51. The water in the line 54 is combined with the methane fuel supply 57 and the combined stream 58 is supplied to the anode compartment 51*a* of the cell 51 and also to the anode passage 2*a* of the cell 2, after passing through a further heat exhanger 59.

The heat exchanger 59 also receives a portion 61A of the exhaust stream 61 from the cathode compartment of the cell 51, the remaining portion 61B of the stream being supplied to the cathode 2*e* passage of the cell 2 as oxidant process gas. The exhaust stream 61A, after passing through heat exchanger 59, is combined in blower 62 with fresh supply oxidant or air and the combined stream 63 supplied to the cathode compartment 51*b* as oxidant process gas.

The exhaust 56 from the anode compartment 51*a*, in turn, is fed to the anode side 64*a* of a hydrogen transfer device 64, similar to the hydrogen transfer device of FIG. 2, resulting in a recovered, substantially pure hydrogen stream 65 portions of which are supplied to anodes 2*a* and 51*a* of the cells 2 and 51. The exhaust stream 66 from the anode 64*a* of device 64 is supplied to a catalytic burner 67 where it is burned with oxidant supplied by a blower 68. The resultant gas 69 is then combined with the stream 63 to form an input oxidant stream 71 for the cathode compartment 51*b* of the cell 51. In this configuration, cooling of the cell 51 is via control of the flow of the oxidant stream 71 in the compartment 51*b*, although a separate cooling passage could have also been provided as in the cell 31 of FIG. 3.

With the system of FIG. 5, the excess oxidant in the exhaust stream of the cathode compartment 51*b* of the conventionally operated cell 51 advantageously provides the oxidant process gas for the cathode 2*e* of the cell 2. Also, this stream is high in carbon dioxide because of the stream 69 forming part of the input stream 71 to the cathode compartment 51*b*. It thus provides the necessary carbon dioxide for the cathode passage 2*e*. Furthermore, the exhaust stream 6 from the cell 2 is used, as above-indicated, in the utilization device 7 which results in greater than about 50% net utilization of hydrogen gas. Maximum utilization of process gas is thus realized.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claim is:

1. A system comprising:

a high temperature fuel cell including: an anode passage comprising an anode electrode, said anode passage being adapted to receive fuel process gas; a cathode passage comprising a cathode electrode, said cathode passage being adapted to receive an oxidant process gas; an electrolyte in communication with said anode and cathode electrodes; catalyst means in said fuel cell for reforming hydrocarbon fuel from a fuel supply to produce fuel process gas including hydrogen for said anode passage;

the fuel process gas and the oxidant process gas at said anode and cathode electrodes in the presence of said electrolyte undergoing electrochemical conversion to produce electrical energy; and the reforming of said hydrocarbon fuel being such as to absorb heat produced by said electrochemical conversion in an amount to maintain the temperature of said fuel cell substantially at a preselected temperature;

and means for receiving the gas exhausted from said anode passage and utilizing the fuel process gas in said exhausted gas such that the net utilization of fuel process gas by said fuel cell and said utilization device exceeds about 50%.

2. A fuel cell system in accordance with claim 1 wherein:

the electrochemical conversion utilizes less than about 50 percent of the hydrogen in said fuel process gas produced by said reforming.

3. A system in accordance with claim 1 wherein:

said means for receiving and utilizing comprises a hydrogen transfer means which operates on said anode passage exhaust to produce a first stream containing substantially exclusively hydrogen gas and a second stream containing the gas in said anode passage exhaust absent the gas in said first stream.

4. A system in accordance with claim 3 wherein:

said anode passage exhaust contains predominantly hydrogen, water, carbon monoxide and carbon dioxide;

and said means for receiving and utilizing further includes shift conversion means for receiving said anode passage exhaust and converting said water and carbon monoxide to hydrogen and carbon dioxide prior to said anode passage exhaust being operated on by said hydrogen transfer device.

5. A fuel cell system in accordance with claim 1 wherein:

said means for receiving and utilizing comprises: a low temperature fuel cell having an anode chamber including a further anode electrode, a cathode chamber including a further cathode electrode and a further electrolyte between said further anode and cathode electrodes; and means for coupling said anode passage exhaust to said anode chamber.

6. A fuel cell system in accordance with claim 5 wherein:

said means for receiving and utilizing further includes: burner means for burning the exhaust from said anode chamber with an oxidant gas; and means for coupling the product gas of said burner to said cathode passage.

7. A fuel cell system in accordance with claim 6 wherein:

said anode passage exhaust contains water and carbon monoxide; and said means for receiving and utilizing further includes shift conversion means for receiving said anode passage exhaust and converting the water and carbon monoxide in said anode passage exhaust to hydrogen and carbon dioxide prior to said anode passage exhaust being coupled to said anode chamber by said coupling means.

8. A fuel cell system in accordance with claim 6 wherein:

said low temperature fuel cell further includes a cooling chamber for receiving a cooling gas;

and said means for receiving and utilizing further includes: a gas recirculation assembly for coupling amounts of an oxidant gas to said cooling and cathode chambers and for coupling a first portion of the oxidant gas exhausted from said cooling chamber back to said cooling and cathode chambers; means for coupling fresh oxidant supply to said first portion of cooling chamber exhaust prior to said amounts of said first portion of cooling chamber exhaust being coupled back to the cooling and cathode chambers; and means for coupling a second portion of said cooling chamber exhaust to said burner as the oxidant gas to be burned with said anode chamber exhaust.

9. A fuel cell system in accordance with claim 1 wherein:

said means for receiving and utilizing includes: a methanol synthesizer means for producing methanol; a reformer for reforming a hydrocarbon supply to produce an input feed gas for said methanol synthesizer means;

and means for coupling said anode passage exhaust to one of said reformer and said input feed gas to aid in controlling the desired stoichiometric number of said feed gas.

10. A fuel cell system in accordance with claim 1 further comprising:

a further high temperature fuel cell having an anode chamber including a further anode electrode, a cathode chamber including a further cathode electrode and a further electrolyte situated between said further anode and cathode electrodes.

11. A fuel cell system in accordance with claim 10 wherein:

said further fuel cell further comprises: a cooling chamber for receiving oxidant gas for cooling said cell;

and said system further includes: means for coupling a portion of the gas exhausted from said cooling chamber to said cathode passage.

12. A system in accordance with claim 11 wherein:

said cooling chamber is formed by said cathode chamber and said oxidant gas for said cooling chamber comprises excess oxidant gas supplied to said cathode chamber beyond that required for the electrochemical conversion reaction.

13. A fuel cell system in accordance with claim 12 wherein:

said means for receiving and utilizing further comprises heat exchanger means for recovering first water from said anode passage exhaust; and means for combining water including said first water with said fuel from said fuel supply.

14. A fuel cell system in accordance with claim 13 further comprising:

means for coupling amounts of said combined water and fuel to said anode passage and said anode chamber.

15. A fuel cell system in accordance with claim 14 further comprising:

further heat exchanger means for recovering second water from the exhaust from said anode chamber; and said water includes said second water.

16. A fuel cell system in accordance with claim 14 further comprising:

additional heat exchanger means for placing said combined water and fuel in heat exchange with a second portion of said cathode chamber exhaust prior to coupling said amounts of combined water and fuel to said anode chamber and anode passage.

17. A fuel cell system in accordance with claim 16 further comprising:

means for combining said second portion of cathode chamber exhaust after passing through said additional heat exchanger means with oxidant gas and coupling said combined second portion of cathode chamber exhaust and oxidant gas to said cathode chamber.

18. A system in accordance with claim 17 further comprising:

a hydrogen transfer means which operates on said anode chamber exhaust to produce a first stream containing substantially exclusively hydrogen gas and a second stream containing the gas in said anode chamber exhaust absent the gas in said first stream;

means for coupling amounts of said first stream to said anode passage and anode chamber;

a burner for burning said second stream with oxidant gas;

and means for coupling the product gas of said burner to said cathode chamber.

19. A fuel cell system in accordance with claim 1 wherein:

said utilizing means in such that said net utilization is in the range of 50% to about 95%.

20. A fuel cell system in accordance with claim 1 wherein:

said catalyst is in said anode passage.

* * * * *